US012799790B2

(12) United States Patent
Rahman et al.

(10) Patent No.: US 12,799,790 B2
(45) Date of Patent: Nov. 17, 2026

(54) POWER TAILGATE MECHANISM

(71) Applicant: Tesla, Inc., Austin, TX (US)

(72) Inventors: Rafath Rahman, Tracy, CA (US); Alex Tran, Austin, TX (US)

(73) Assignee: Tesla, Inc., Austin, TX (US)

( * ) Notice: Subject to any disclaimer, the term of this patent is extended or adjusted under 35 U.S.C. 154(b) by 0 days.

(21) Appl. No.: 18/718,666

(22) PCT Filed: Dec. 8, 2022

(86) PCT No.: PCT/US2022/052277
§ 371 (c)(1),
(2) Date: Jun. 11, 2024

(87) PCT Pub. No.: WO2023/114084
PCT Pub. Date: Jun. 22, 2023

(65) Prior Publication Data

US 2025/0043617 A1 Feb. 6, 2025

Related U.S. Application Data

(60) Provisional application No. 63/265,689, filed on Dec. 17, 2021.

(51) Int. Cl.
*E05F 1/12* (2006.01)
*B62D 33/027* (2006.01)
(Continued)

(52) U.S. Cl.
CPC ........ *E05F 1/1238* (2013.01); *B62D 33/0273* (2013.01); *E05B 81/20* (2013.01); *E05F 15/60* (2015.01); *E05F 15/77* (2015.01); *E05Y 2201/624* (2013.01); *E05Y 2201/702* (2013.01); *E05Y 2400/32* (2013.01); *E05Y 2800/428* (2013.01); *E05Y 2900/544* (2013.01)

(58) Field of Classification Search
CPC .......... E05F 15/611; E05F 1/1238; E05F 1/08
See application file for complete search history.

(56) References Cited

U.S. PATENT DOCUMENTS

| | | | |
|---|---|---|---|
| 6,357,813 | B1 | 3/2002 | Vandeberghe et al. |
| 8,764,090 | B2 | 7/2014 | Kerr |

(Continued)

FOREIGN PATENT DOCUMENTS

| | | |
|---|---|---|
| CN | 118574975 | 8/2024 |
| WO | WO-2018023096 A1 | 2/2018 |
| WO | 2023114084 | 6/2023 |

OTHER PUBLICATIONS

"International Application Serial No. PCT/US2022/052277, International Search Report mailed Jul. 21, 2023", 4 pgs.

(Continued)

*Primary Examiner* — Gregory J Strimbu
(74) *Attorney, Agent, or Firm* — Schwegman Lundberg & Woessner, P.A.

(57) ABSTRACT

A system for moving a closure panel between an open position and a closed position. A hinge couples the closure panel to a body. The system can include an actuator for driving the closure panel between the open position and the closed position. A torque generated by a counterweight member reduces a mechanical effort provided by the actuator to drive the closure panel.

10 Claims, 7 Drawing Sheets

(51) Int. Cl.

| | |
|---|---|
| *E05B 81/20* | (2014.01) |
| *E05F 15/60* | (2015.01) |
| *E05F 15/77* | (2015.01) |

(56) References Cited

U.S. PATENT DOCUMENTS

| | | | | |
|---|---|---|---|---|
| 10,569,812 | B2 | 2/2020 | Tyagi et al. | |
| 2008/0201903 | A1* | 8/2008 | Sovis | E05F 1/1215 16/277 |
| 2016/0347379 | A1* | 12/2016 | Shaw | E05F 1/1238 |
| 2017/0089116 | A1 | 3/2017 | Heiberger et al. | |
| 2017/0342758 | A1 | 11/2017 | Grudzinski et al. | |
| 2018/0051501 | A1* | 2/2018 | Söderqvist | E05F 15/63 |
| 2018/0119472 | A1* | 5/2018 | Hucker | E05F 1/10 |
| 2018/0272976 | A1* | 9/2018 | Root | B60R 21/0134 |
| 2018/0328097 | A1* | 11/2018 | Holt | B60J 5/04 |
| 2019/0330907 | A1 | 10/2019 | Marchlewski et al. | |
| 2019/0368255 | A1* | 12/2019 | Schatz | E05F 15/611 |
| 2020/0190887 | A1* | 6/2020 | Gerken | B62D 33/0273 |
| 2020/0340282 | A1 | 10/2020 | Sproule et al. | |
| 2021/0371017 | A1 | 12/2021 | Heins et al. | |
| 2022/0070635 | A1* | 3/2022 | Ekman | H04W 64/006 |
| 2022/0235596 | A1* | 7/2022 | Schalyo | E05F 15/611 |
| 2022/0297771 | A1* | 9/2022 | Ozog | H02P 27/08 |

OTHER PUBLICATIONS

"International Application Serial No. PCT/US2022/052277, Written Opinion mailed Jul. 21, 2023", 6 pgs.

"European Application Serial No. 22850769.5, Response to Communication Pursuant to Rules 161 and 162 EPC Filed Dec. 4, 2024", 31 pgs.

"International Application Serial No. PCT US2022 052277, International Preliminary Report on Patentability mailed Jun. 27, 2024", 8 pgs.

"Japanese Application Serial No. 2024-535617, Notification of Reasons for Refusal mailed Jun. 30, 2026", w English translation, 8 pgs.

"Japanese Application Serial No. 2024-535617, Response filed Aug. 19, 2026 to Notification of Reasons for Refusal mailed Jun. 30, 2026", W/English Claims, 17 pgs.

"Korean Application Serial No. 10-2024-7022436, Notice of Preliminary Rejection mailed Jul. 31, 2026", w/English translation, 10 pgs.

* cited by examiner

POWER TAILGATE MECHANISM

CROSS-REFERENCE TO RELATED APPLICATIONS

This application is a U.S. National Stage Filing under 35 U.S.C. § 371 from International Application No. PCT/US2022/052277, filed on Dec. 8, 2022, and published as WO2023/114084 on Jun. 22, 2023, which claims the benefit of U.S. Provisional Application No. 63/265,689, filed Dec. 17, 2021; the benefit of priority of each of which is hereby claimed herein, and which applications and publication are hereby incorporated herein by reference in their entireties.

TECHNICAL FIELD

This application relates to power systems for opening and closing hinged closure panels, particularly the tailgate of a vehicle such as a truck, SUV, or the like.

BACKGROUND

Generally described, a variety of vehicles, such as electric vehicles, combustion engine vehicles, hybrid vehicles, commercial vehicles, trucks, SUVs, semi-trucks, etc., can be configured with hinged closure panels. Many trucks have tailgates that can open to extend the bed and permit loading and unloading, and close to create a confined area. The tailgate can swing between the open and closed positions to selectively provide access inside the bed. Typically, a range of motion of the tailgate is through about 90 degrees from the opened position to the closed position. Existing latch arrangements may include strikers that are mounted to the vehicle structure and aligned so as to engage latches in the tailgate when the tailgate is in the closed position.

SUMMARY

An aspect is directed to a system for moving a hinge between an open position and a closed position. The hinge coupling a closure panel to a body. The system comprises an actuator for driving the closure panel between the open position and the closed position relative to the body and a counterweight member for reducing a mechanical effort provided by the actuator to drive the closure panel.

A variation of the aspect above is, wherein the closure panel comprises an outer panel, an interior panel, and an inner space between the outer panel and the interior panel, the counterweight member being mounted in the inner space.

A variation of the aspect above is, wherein the actuator is disposed outside the inner space of the closure panel.

A variation of the aspect above is, wherein the counterweight member is a torsion spring configured to twist along its axis.

A variation of the aspect above is, wherein the counterweight member is a torsion rod configured to resist twisting and have a strong tendency to untwist.

A variation of the aspect above is, wherein the actuator moves between an extended configuration and a retracted configuration along a first axis, and wherein the counterweight member rotates about a second axis, the second axis being different than the first axis.

A variation of the aspect above further comprises at least one latch configured to lock the closure panel in the closed position.

A variation of the aspect above is, wherein the at least one latch is configured to cinch the closure panel towards the closed position.

A variation of the aspect above further comprises a controller configured to control at least the actuator.

A variation of the aspect above further comprises a switch configured to trigger the controller.

A variation of the aspect above is, wherein the switch is disposed on a wireless key fob.

A variation of the aspect above is, wherein the switch is accessed via a GUI on a smart phone.

A variation of the aspect above is, wherein the switch is disposed on the body.

A variation of the aspect above further comprises at least one sensor configured to sense a position of the closure panel.

A variation of the aspect above is, wherein the closure panel is a vehicle tailgate.

A variation of the aspect above is, wherein the body is a truck.

A variation of the aspect above is, wherein the body is a sport utility vehicle.

A variation of the aspect above is, wherein the actuator is a linear actuator.

A variation of the aspect above further comprises a crank arm, the crank arm operatively linking the closure panel to the actuator.

A variation of the aspect above is, wherein the actuator comprises a plurality of sockets, and wherein the body and the crank arm each comprise a ball configured to be disposed in one of the plurality of sockets.

A variation of the aspect above is, wherein the body comprises an outer panel, an interior panel, and an inner space between the outer panel and the interior panel, the actuator being mounted in the inner space.

An aspect is directed to a system for opening and closing a tailgate of a vehicle between an open position and a closed position. The system comprises a linear actuator comprising a spindle and an outer tube, the spindle being movable between an extended position and a retracted position relative to the outer tube, the linear actuator being configured to drive the tailgate from the open position towards the closed position when the spindle moves from the retracted position to the extended position, a crank arm operatively linking the tailgate to the linear actuator, and a counterweight member disposed in the tailgate and configured to reduce a mechanical effort provided by the actuator to drive the tailgate to the closed position.

A variation of the aspect above is, wherein the tailgate comprises an outer panel, an interior panel, and an inner space, the counterweight member being configured to be mounted in the inner space.

A variation of the aspect above is, wherein the actuator is configured to be disposed outside the inner space.

A variation of the aspect above is, wherein the counterweight member is a torsion spring.

A variation of the aspect above is, wherein the counterweight member is a torsion rod.

A variation of the aspect above is, wherein the actuator is a linear actuator.

A variation of the aspect above further comprises at least one latch configured to lock the tailgate in the closed position.

A variation of the aspect above is, wherein the at least one latch is configured to cinch the tailgate towards the closed position.

A variation of the aspect above further comprises a controller configured to control at least the linear actuator.

A variation of the aspect above further comprises a switch configured to trigger the controller.

A variation of the aspect above is, wherein the switch is disposed on a wireless key fob.

A variation of the aspect above is, wherein the switch is accessed via a GUI on a smart phone.

A variation of the aspect above further comprises at least one sensor configured to sense a position of the tailgate.

An aspect is directed to a method of closing a tailgate of a vehicle. The method comprises extending a spindle of a linear actuator so as to rotate the tailgate towards a closed position, and releasing mechanical energy stored in a counterweight to assist the linear actuator rotating the tailgate towards the closed position.

A variation of the aspect above further comprises cinching the tailgate to the closed position.

A variation of the aspect above is, wherein the counterweight member is a torsion spring.

A variation of the aspect above is, wherein the counterweight member is a torsion rod.

A variation of the aspect above further comprises sensing a position of the tailgate.

A variation of the aspect above is, wherein the position is an open position.

A variation of the aspect above is, wherein extending the spindle is based at least in part on the sensed position.

BRIEF DESCRIPTION OF THE DRAWINGS

The present inventions are described with reference to the accompanying drawings, in which like reference characters reference like elements, and wherein.

DETAILED DESCRIPTION

Figure 1:
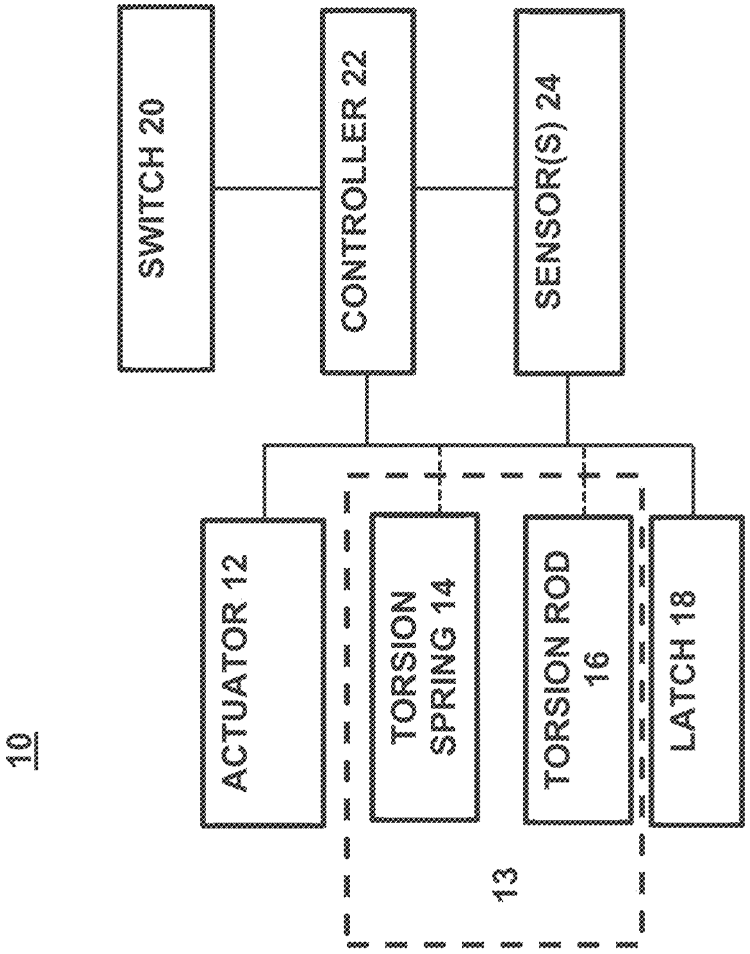
FIG. 1 is a block diagram of a system including an actuator and a counterweight member for controlling a position of a closure panel for a vehicle according to an exemplary embodiment of the present disclosure.

Generally described, one or more aspects of the present disclosure relate to power systems for opening and closing hinged closure panels, particularly the tailgate of a vehicle. Power tailgates often require complex systems involving a plurality of expensive components (e.g., sensors, mechanical and computer components). Further, known power systems can be bulky which can limit the ability to efficiently and compactly package the system within the vehicle.

Embodiments disclosed herein can provide advantages over such power systems. For example, in certain embodiments, the power system can significantly reduce the number of required components. This reduction of components can significantly reduce the supply-chain overhead, installation time, and cost. The system can have an improved reliability due to, for example, the reduction in components. A power system can be advantageous in overcoming adverse weather conditions such as when an ice bridge forms between the tailgate and the truck bed. Certain embodiments of the power system disclosed herein can break the ice bridge formed between the tailgate and the truck bed. For example, the user can simply activate an actuator of the power system to free a tailgate that is frozen to the truck bed.

In certain embodiments, the power system can ease assembly with the vehicle. For example, in certain embodiments, the actuator of the system can comprise a plurality of sockets while the vehicle and the crank arm each comprise a ball configured to be disposed in one of the plurality of sockets to ease assembly.

The actuator can be mounted to the vehicle in many different arrangements and configurations. For example, in certain embodiments, the actuator can be mounted vertically. In other embodiments, the actuator can be mounted horizontally. In still other embodiments, the actuator can be mounted at any angle between a horizontal mounting and a vertical mounting.

In certain embodiments, the power system can have a lower mass and lower cost than known power systems. A lower mass is advantageous since it improves, for example, a vehicle's range. The characteristics of the system (e.g., size, weight, pressure, materials, etc.) disclosed herein are only exemplary and do not limit the scope of the disclosure.

In certain embodiments, the power system is hidden between panels of the vehicle (e.g., tailgate, body) resulting essentially in an invisible integration with the vehicle. For example, the vehicle can comprise an outer panel, an interior panel, and an inner space between the outer panel and the interior panel. The actuator can be mounted in the inner space. For example, the tailgate can comprise an outer panel, an interior panel, and an inner space between the outer panel and the interior panel. A counterweight member can be mounted in the inner space.

In certain embodiments, the system employs a torsion spring in combination with a compact, low power, low mass actuator. In certain embodiments, the system employs a torsion rod in combination with the compact, low power, low mass actuator. Of course, the disclosure is not limited to employing a torsion spring and/or torsion rod as the counterweight member.

While the power system disclosed herein is described in the context of opening and closing a tailgate of a truck or SUV, the invention is not so limited. Embodiments of the system described herein can be employed in the place of any power system or linkage that is intended to open or close a hinged panel. For example, the system can be employed as part of a vehicle storage compartment mounted in the truck bed (e.g., a truck bed storage drawer or box) or as part of a cargo-hauling system dimensioned to fit within the bed of the truck. Of course, the system is not limited to use with trucks or SUVs and can be employed with any type of vehicle.

Figure 2:
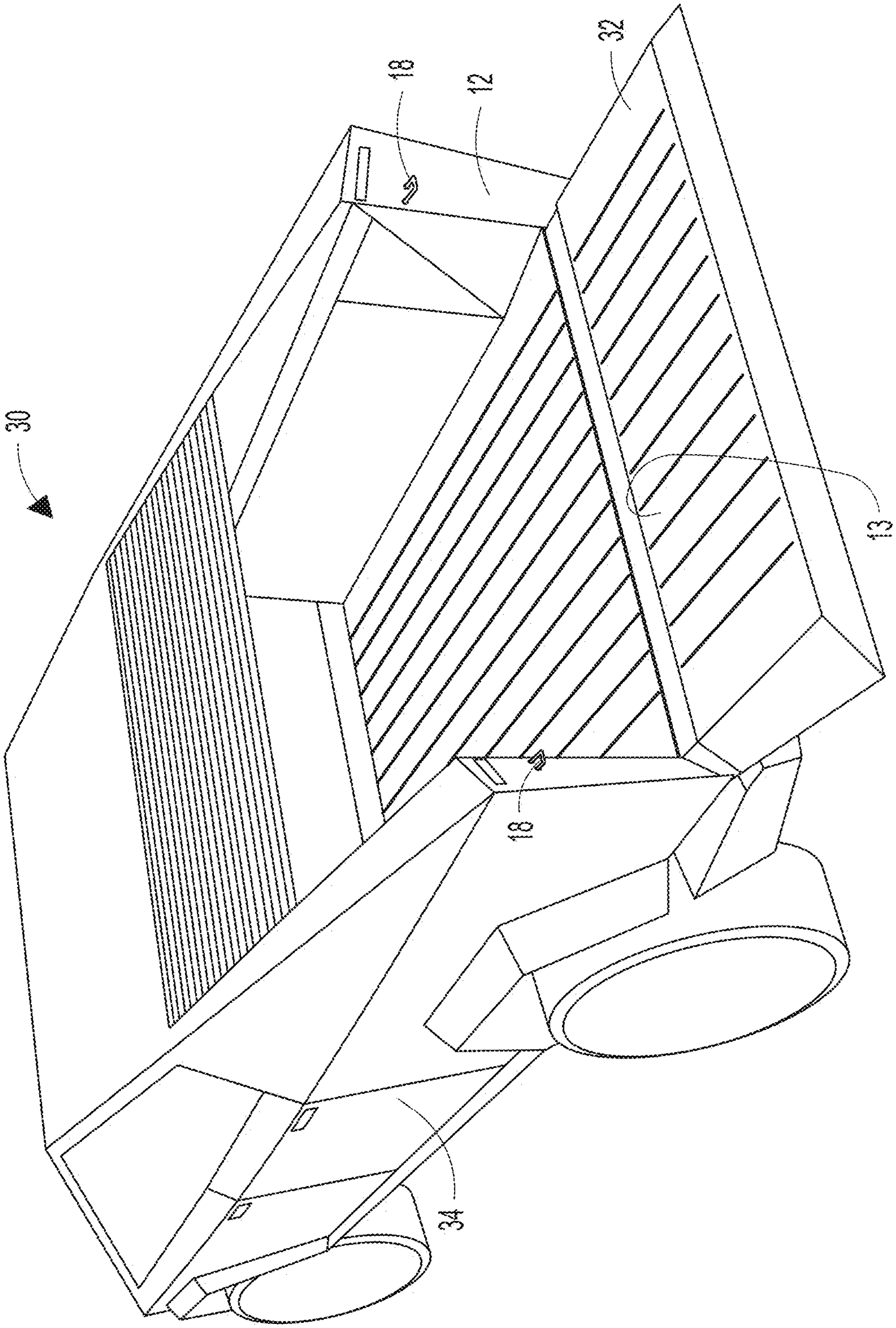
FIG. 2 is an exemplary illustration of a vehicle that includes the system of FIG. 1 with a tailgate in an open position.

FIG. 1 is a block diagram of a system 10 for controlling a position of a closure panel for a vehicle according to an exemplary embodiment of the present disclosure. FIG. 2 is an exemplary illustration of a vehicle 30 that includes the system 10 of FIG. 1. The tailgate 32 (e.g., closure panel) in FIG. 2 is in an open position. As shown in FIGS. 1 and 2, the system 10 can comprise an actuator 12 and a counterweight member 13 (e.g., torsion spring 14, torsion rod 16, etc.) for reducing a mechanical effort provided by the actuator 12. For example, in certain embodiments, the actuator 12 is a linear actuator. Of course the type of actuator is not limited to a linear actuator and can be any other type of actuator including rotary actuators, hydraulic actuators, pneumatic actuators, electric actuators, etc.

In certain embodiments, the counterweight member 13 is a torsion spring 14. In certain embodiments, the torsion spring 14 twists along its axis. For example, in certain embodiments, the torsion spring 14 is a helical spring that exerts a torque or rotary force. The ends of the torsion spring 14 are attached to other components (e.g., tailgate and body), and when one of those components rotates around the center of the torsion spring 14, the torsion spring 14 tries to push the component back to its original position. In certain other embodiments, the counterweight member 13 is a torsion rod 16. In certain embodiments, the torsion rod 16 resists twisting and has a strong tendency to untwist.

The system 10 can further include one or more latches 18. For example, in certain embodiments, the latch 18 is configured to lock the tailgate 32 (e.g., closure panel) in a closed position. In certain embodiments, the one or more latches 18 cinch the tailgate 32 towards the closed position. In certain embodiments, the one or more latches 18 are disposed inside the tailgate 32. In certain embodiments, a portion of each latch 18 is accessible through a wall of the tailgate 32 to engage with a complementary latch member on the vehicle 30. In certain embodiments, the one or more latches 18 are electromagnetic.

In certain embodiments, the one or more latches 18 can comprise a pair of strikers or pins 48 (FIG. 3) extending inwardly from rear edge portions of sidewalls of the vehicle 30 towards opposite side edges 66, 68 of the tailgate 32. In certain embodiments, the one or more latches 18 can comprises movable latch members 50 that are mounted in an opening in the side edges 66, 68 of the tailgate 32. In certain embodiments, the movable latch members 50 releasably engage and cinch the strikers 48 when the movable latch members 50 are brought in close proximity to the strikers 48. In this way, in certain embodiments, the one or more latches 18 can complete the closing process by pulling the tailgate 32 closed once the actuator 12 and the counterweight member 13 move the tailgate 32 sufficiently towards the closed position so that the movable latch members 50 can contact and pull the strikers 48 to complete the closing process.

In certain embodiments, a handle (not shown) is movably mounted to the tailgate 32. In certain embodiments, a user can manually open the tailgate 32 by pulling on the handle to release the one or more latches 18 to thereby permit the tailgate 32 to be moved from the closed position to the open position.

Referring back to FIG. 1, in certain embodiments, the system 10 can include a switch 20. In certain embodiments, activation of the switch 20 causes the actuator 12 to move the tailgate 32 between the open and closed positions. In certain embodiments, the switch 20 is configured to be activated by a user. In certain embodiments, the switch 20 is disposed on a wireless key fob. In certain embodiments, the switch 20 is accessed via a GUI on a smart phone. In certain embodiments, the switch 20 is disposed on the vehicle 30.

In certain embodiments, the system 10 can include a controller 22. In certain embodiments, the controller 22 is configured to move the tailgate 32 between the open and closed positions. In certain embodiments, the controller 22 can be configured to receive a trigger signal. In certain embodiments, the trigger signal is provided by a signal source. In certain embodiments, the controller 22 moves the tailgate 32 between the open and closed positions in response to receiving the trigger signal from the signal source. In certain embodiments, the signal source can be a smartphone or smart device, or input components associated with the vehicle 30 (e.g., touch screen interfaces, microphones, vision system, pressure sensing system, etc.). In certain embodiments, the switch 20 is configured to trigger the controller 22.

In certain embodiments, the system 10 can further include one or more sensors 24. In certain embodiments, the one or more sensors 24 can be configured to sense a position of the tailgate 32 (closed position, open position, any location between the closed and open positions), contact between the tailgate 32 and the body 34 of the vehicle 30, torque of the counterweight member 13 (e.g., torsion spring 14, torsion rod 16, etc.), inclination of the vehicle 32, and/or objects blocking the tailgate 32 from moving to the open position or to the closed position. For example, in certain embodiments, the controller 22 receives torque information from the sensor 24. In certain embodiments, the controller 22 can further determine the tension on the actuator 12 or a torque of the counterweight member 13. In certain embodiments, the controller 22 can be configured to determine the tightness of the attachment between the tailgate 32 the vehicle 30 on a periodic or continual basis. In certain embodiments, the tightness is determined in real time.

In certain embodiments, the controller 22 is configured to control the system 10, e.g., whether to and/or how to, e.g., position, speed, etc., the tailgate 32 upon receiving information from the one or more sensors 24. The one or more sensors 24, such as a position sensor, an angle sensor, or the like, can receive information about the position of the tailgate 32 such as, for example, angular position. In certain embodiments, the one or more sensors 32 is configured to generate and/or send a signal and/or information to the controller 22 indicative of an angle of the tailgate 32. In certain embodiments, the one or more sensors 24 provide feedback voltage signals to the controller 22 that are related to the tension on the actuator 12 or the counterweight member 13.

Figure 3:
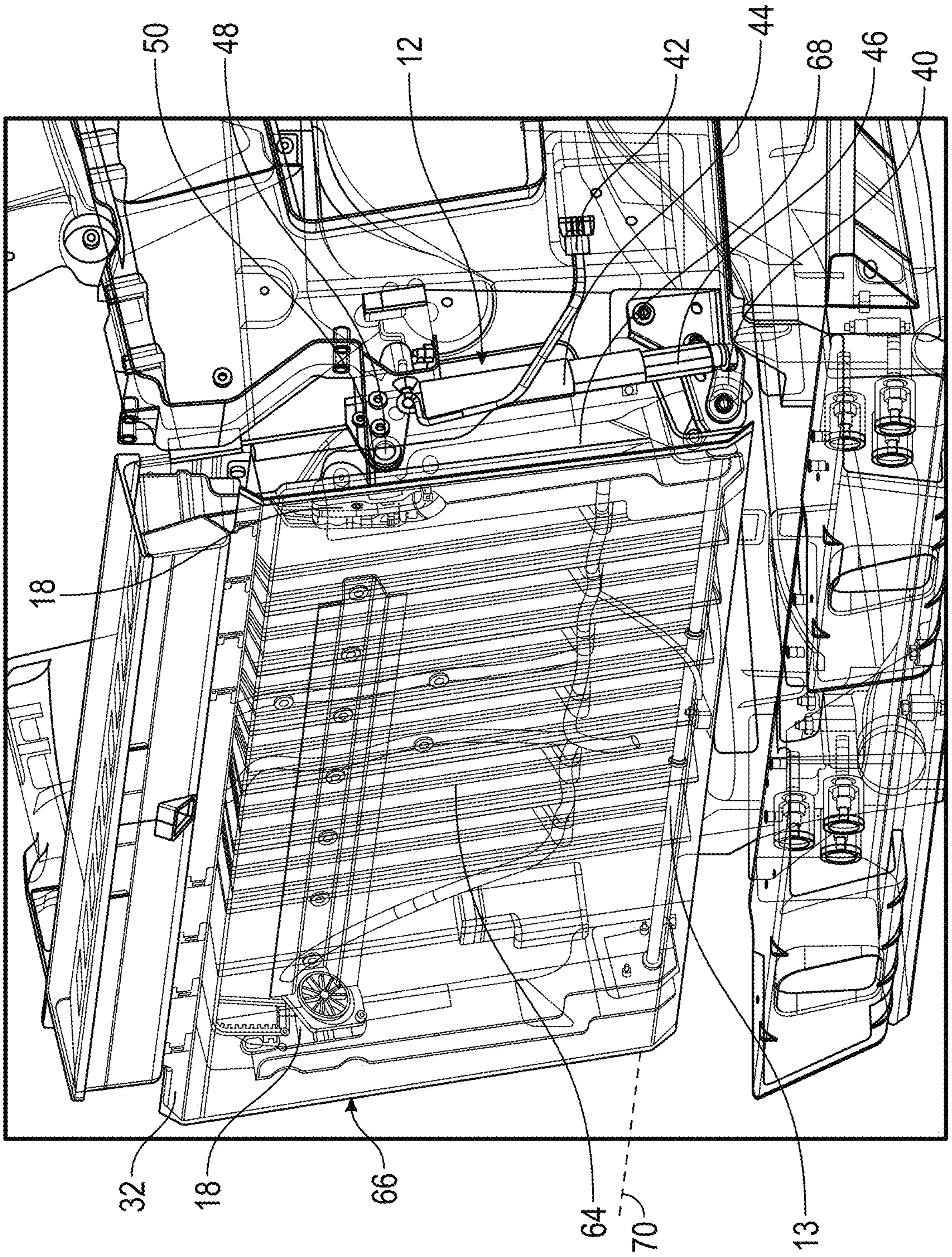
FIG. 3 is a partial perspective view of the vehicle from FIG. 2 with the tailgate in an almost closed position showing the actuator and the counterweight member from FIG. 1.

FIG. 3 is a partial perspective view of the vehicle 30 from FIG. 2 with the tailgate 32 in an almost closed position showing the actuator 12 and the counterweight member 13 from FIG. 1. The tailgate 32 can comprise an outer panel 60 (FIG. 4A), an interior panel 62 (FIG. 4A), and an inner space 64 between the outer panel 60 and the interior panel 62. In certain embodiments, the counterweight member 13 is mounted in the inner space 64. In certain embodiments, the counterweight member 13 rotates about an axis 70. In certain embodiments, the axis 70 is horizontal or parallel to the ground.

In certain embodiments, the counterweight member 13 is configured as a torsion spring 14. The torsion spring 14 can comprise a spring that works by twisting its end along its axis 70. In certain embodiments, the torsion spring 14 is a flexible elastic object that stores mechanical energy when it is twisted. When it is twisted, the torsion spring 14 exerts a torque in the opposite direction (e.g., close direction), proportional to the amount (angle) the torsion spring 14 is twisted. In certain embodiments, the torsion spring 14 is preloaded so as to exert a torque in the opposite direction (e.g., close direction) when the tailgate 32 is in the closed position.

In certain embodiments, the latch 18 provides a power cinching feature. In certain embodiments, the latch 18 includes an electric power cinch actuator configured to cause the latch 18 to tightly close the tailgate 32, thereby moving the tailgate 32 from its partially-closed position into its fully-closed position. In certain embodiments, the latch 18 is normally maintained in a non-actuated condition. In certain embodiments, the latch 18 is only shifted into an actuated condition when one or more sensors 24 associated with the latch 18 indicate that the strikers or pins 48 are located in proximity to the movable latch member 50.

In certain embodiments, the system 10 comprises a wiring harness 42. The actuator 12 can connect to components of the system 10 via the wiring harness 42. In certain embodiments, the wiring harness 42 connects the actuator 12 to the controller 22.

Figure 4B:
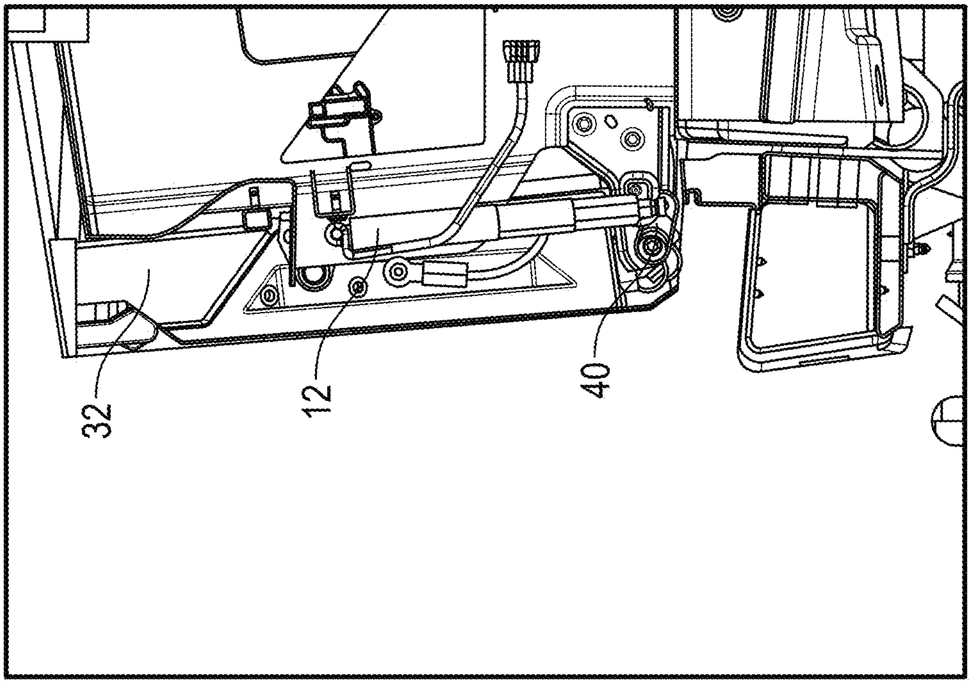
FIG. 4B is similar to FIG. 4A except the tailgate is in the closed position with the actuator in an extended configuration.
Figure 4A:
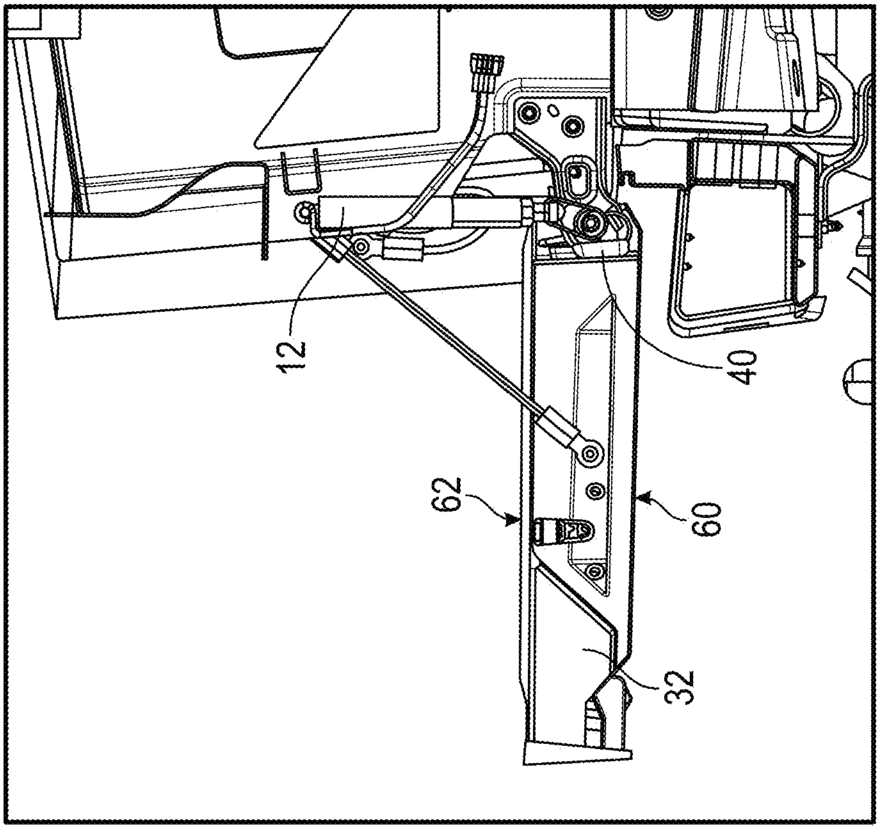
FIG. 4A is a side view of the tailgate from FIG. 3 in an open position with the actuator in a retracted configuration.

FIG. 4A is a side view of the tailgate 32 from FIG. 3 in an open position with the actuator 12 in a retracted configuration. FIG. 4B is similar to FIG. 4A except the tailgate 32 is in the closed position with the actuator 12 in an extended configuration. The actuator 12 can be mounted to the vehicle 30 in many different arrangements and configurations. For example, in certain embodiments, the actuator 12 can be mounted vertically. In other embodiments, the actuator 12 can be mounted horizontally. In still other embodiments, the actuator 12 can be mounted at any angle relative to the vehicle 30 between a horizontal mounting and a vertical mounting.

Figure 5B:
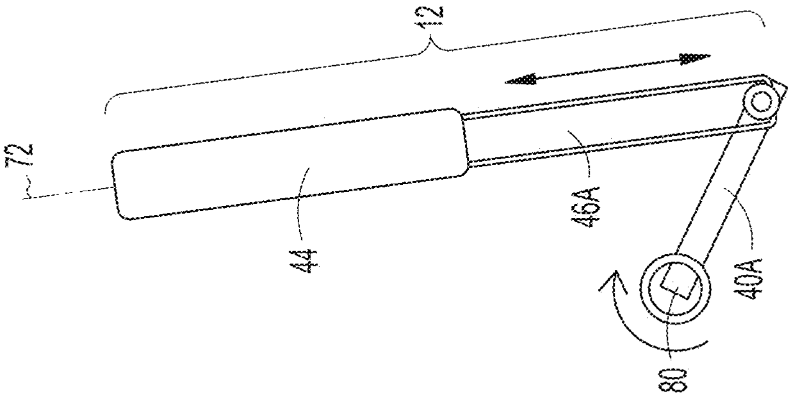
FIG. 5B is similar to FIG. 5A except the system has moved the tailgate to the closed position.
Figure 5A:
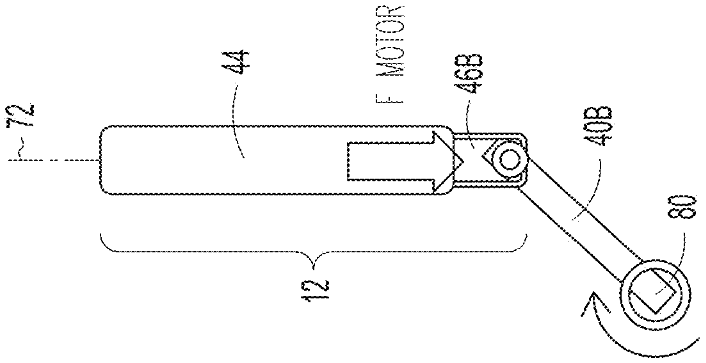
FIG. 5A is an illustration of the relative positioning of a crank arm and the actuator when the tailgate is in the open position.

FIG. 5A is an illustration of the relative positioning of the crank arm 40 and the actuator 12 when the tailgate 32 is in the open position. FIG. 5B is similar to FIG. 5A except the system 10 has moved the tailgate 32 to the closed position. In FIGS. 5A and 5B, a location of the spindle 46 changes between an extended position of the spindle 46A (FIG. 5B) and a retracted position of the spindle 46B (FIG. 5A) as the tailgate 32 moves between the closed and opened positions, respectively. Similarly, in FIGS. 5A and 5B, a location of the crank arm 40 changes between a first position (FIG. 5A) of the crank arm 40B and a second position (FIG. 5B) of the crank arm 40A as the tailgate 32 moves between the open (FIG. 5A) and closed (FIG. 5B) positions, respectively. In certain embodiments, the crank arm 40A, 40B pivots about point 80.

In certain embodiments, the actuator 12 is configured as a linear actuator. In certain embodiments, the actuator 12 comprises an outer tube 44 and a spindle 46. In certain embodiments, the actuator 12 moves between a retracted configuration (FIGS. 4A, 5A) and an extended configuration (FIGS. 4B, 5B) along an axis 72. In certain embodiments, the actuator 12 is disposed inside the body 34. In certain embodiments the actuator 12 is disposed outside the inner space 64 of the tailgate 32.

In certain embodiments, the actuator 12 creates motion in a straight line along axis 72. The actuator 12 adjusts the position of the tailgate 32. The actuator 12 can be a linear actuator. In certain embodiments, the actuator 12 can comprise an electric motor drive assembly that drives the threaded spindle 46. In certain embodiments, the spindle 46 can be retained within the outer tube 44, and the electric motor drive assembly can be disposed within the outer tube 44. In certain embodiments, a pusher block can be threaded onto the spindle 46 and can be secured in linear recesses within the outer tube 44. As the electric motor drive assembly turns the spindle 46, the pusher block moves from one end of the outer tube 44 to the other end. In certain embodiments, the direction of movement is determined by the direction of rotation within the outer tube 44.

In certain embodiments, the counterweight member 13 rotates about the axis 70 while the actuator 12 moves between the extended configuration and the retracted configuration along the axis 72. In certain embodiments, the axis 72 is generally perpendicular relative to the axis 70. In certain embodiments, the axes 70, 72 are askew.

Figure 6:
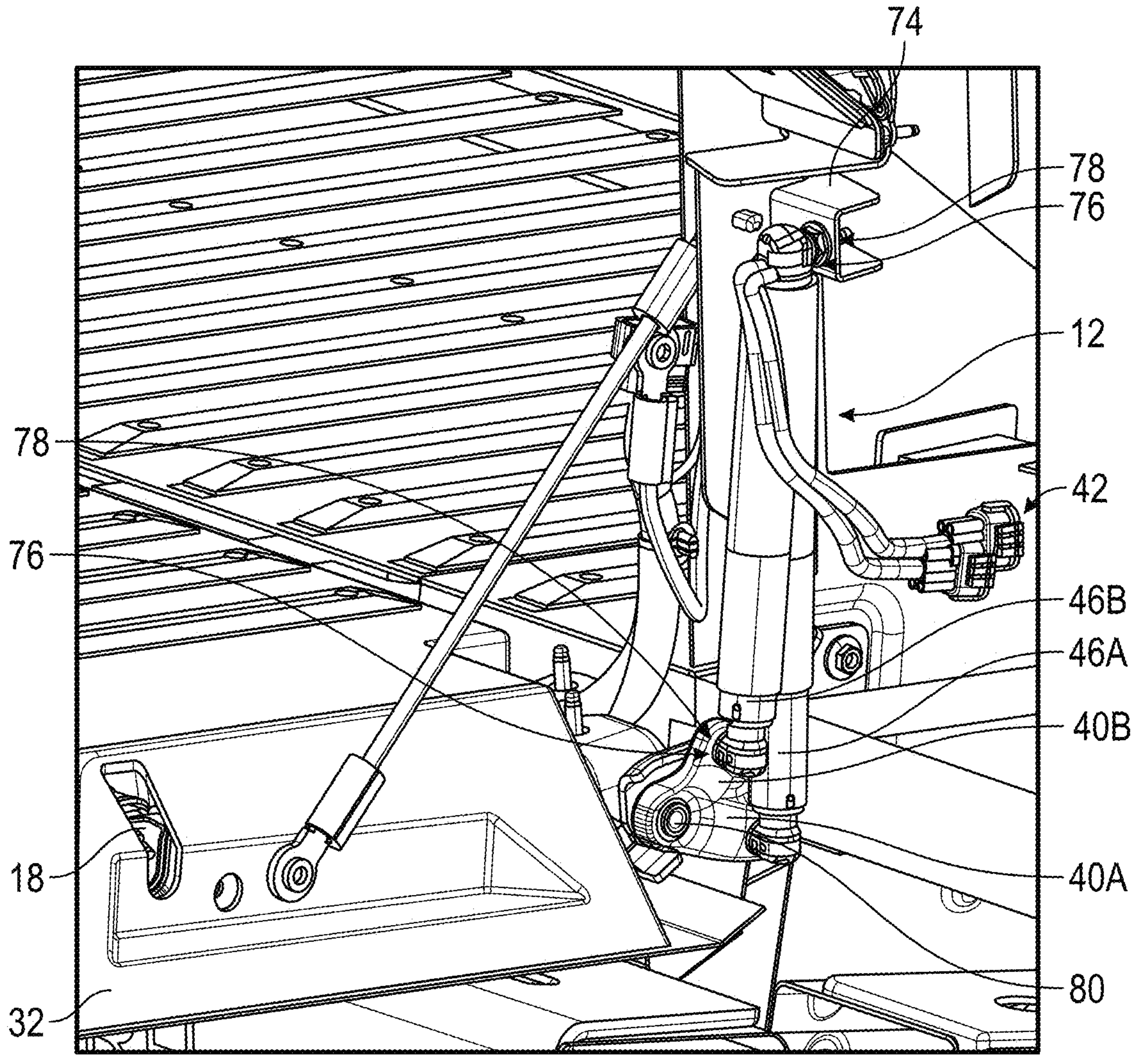
FIG. 6 are superimposed views of the crank arms and actuators from FIGS. 4A and 4B in both closed and open positions.

FIG. 6 are superimposed views of the crank arms 40A, 40B and actuators 12 from FIGS. 4A and 4B in both closed and open positions. In certain embodiments, one end of the actuator 12 may be secured to the body 34 by a mounting bracket 74. The spindle 46A, 46B of the actuator 12 may be attached to the tailgate 32 via the crank arm 40A, 40B (e.g., levers, linkages, etc.). In certain embodiments, one end of the respective crank arm 40A, 40B is secured to the spindle 46A, 46B with one or more fasteners. In certain embodiments, the other end of the crank arm 40A, 40B is connected to the tailgate 32. In certain embodiments, movement of the pusher block moves the crank arm 40A, 40B and adjusts the position of the tailgate 32 as is illustrated in the superimposed views of FIG. 6.

In certain embodiments, the actuator 12 can comprise a plurality of sockets 76 while the vehicle 30 and the crank arm 40 each comprise a ball 78 configured to be disposed in one of the plurality of sockets 76. The ball 78 and socket 76 arrangement facilitates relative angular movement between the body 34 and the crank arm 40. In certain embodiments, the ball 78 and the socket 76 arrangement includes a spherical knob that is fitted into a socket 76 defining an interior which receives the ball 78. In certain embodiments, the ball 78 and socket 76 arrangement includes a socket 76 having an opening that is slightly smaller than the radius of curvature for the ball 78. When the ball 78 is coupled with the socket 76, the ball 78 is secured within the socket 76. In certain embodiments, the entry within the socket 76 is adjustable to allow the ball 78 to be easily inserted into or removed from the socket 76.

The system 10 can be advantageous in overcoming adverse weather conditions such as when an ice bridge forms between the tailgate 32 and the truck bed of the body 34. Certain embodiments of the system 10 disclosed herein can break the ice bridge formed between the tailgate 32 and the truck bed of the body 34. For example, the user can simply activate the actuator 12 to free the tailgate 32 that is frozen to the truck bed of the body 34.

Figure 7:
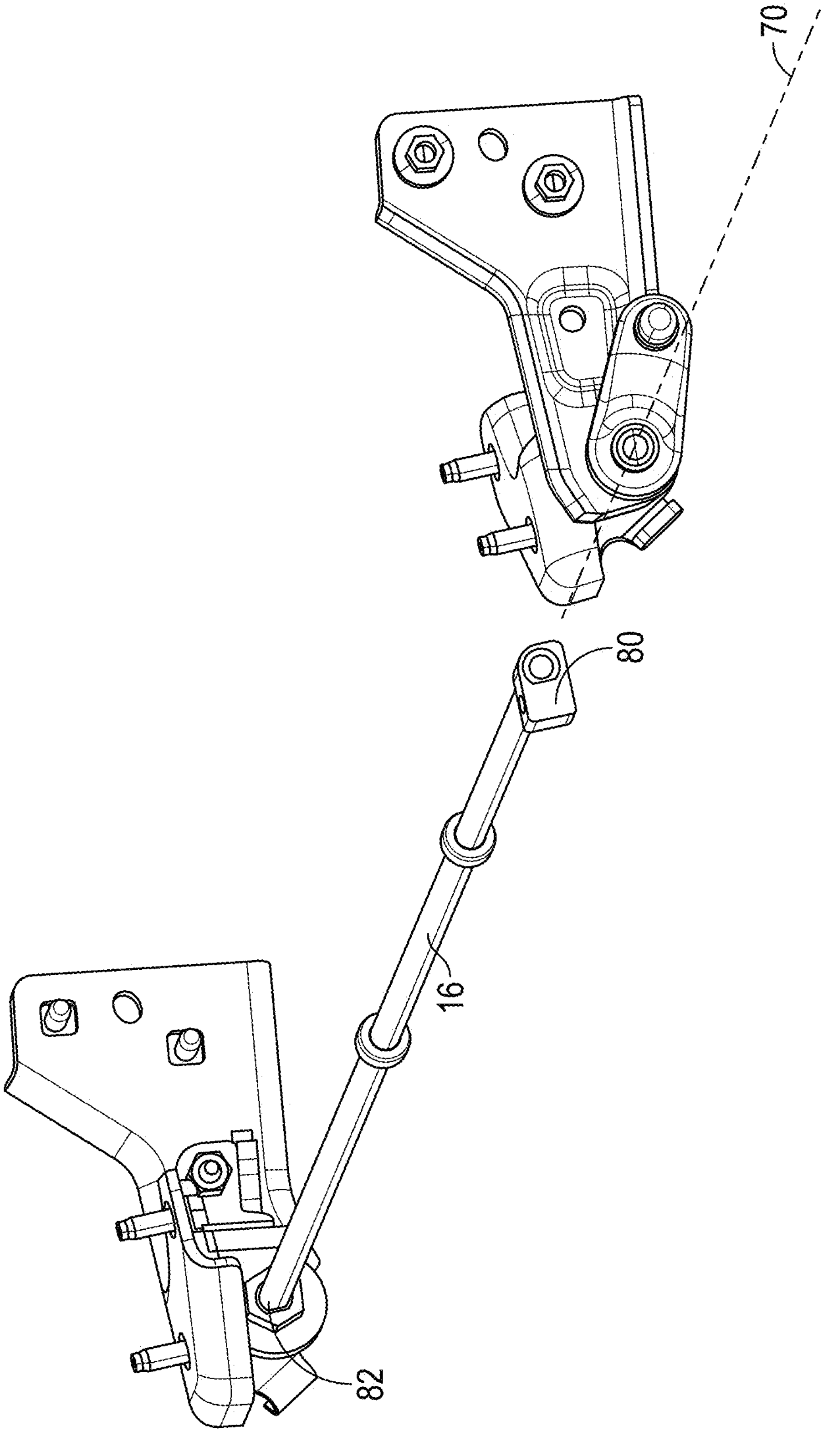
FIG. 7 is a perspective view of a torsion rod from an embodiment of the system in FIG. 1.

FIG. 7 is a perspective view of a torsion rod 16 from an embodiment of the system 10 in FIG. 1. In certain embodiments, the counterweight member 13 is configured as a torsion rod 16. Rotation of the torsion rod 16 can be used to counterbalance the weight of the tailgate 32 to aid in the rotating of the tailgate 32. In certain embodiments, the torsion rod 16 provides more desirable performance characteristics for the system 10. In certain embodiments, the torsion force produced by the rotation of the torsion rod 16 may be utilized in a single direction of rotation of the tailgate 32.

In certain embodiments, the torsion rod 16 can also produce sufficient torsion force to aid in rotating the tailgate 32 even when the tailgate 32 has substantial weight.

In certain embodiments, the torsion rod 16 comprises a first end 80 fixedly positioned relative to the tailgate 32 proximate a first location on the tailgate 32, and a second end 82 fixedly positioned relative to the body 34 proximate a second location. In certain embodiments, the torsion rod 16 is configured to be rotated as the tailgate 32 (e.g., first end 80) is rotated relative to the body 34 producing a torsion force. In certain embodiments, the torsion rod 16 can twist its end along its axis 70. In certain embodiments, the torsion rod 16 is a flexible elastic object that stores mechanical energy when it is twisted. When it is twisted, the torsion rod 16 exerts a torque in the opposite direction (e.g., close direction), proportional to the amount (angle) the torsion rod 16 is twisted.

While the power system 10 disclosed herein is described in the context of vehicle 30 with respect to the tailgate 32 of the vehicle 30, the invention is not so limited. Embodiments of the power system 10 described herein can be employed in the place of any linkage that is intended to transfer or monitor motion.

Characteristics of the power system 10 (e.g., size, weight, pressure, materials, etc.) disclosed herein are only exemplary. For example, the materials can be selected to withstand significant elastic strain without yielding while also minimizing deflection in a nominal condition.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed glove box actuation assembly. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other. Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application.

What is claimed:

1. A system for moving a tailgate of a vehicle between an open position and a closed position, the system comprising:

a linear actuator comprising a spindle and an outer tube, the spindle being movable between an extended position and a retracted position relative to the outer tube, the linear actuator being configured to drive the tailgate from the open position towards the closed position when the spindle moves from the retracted position to the extended position;

a crank arm operatively linking the tailgate to the linear actuator;

a counterweight member disposed in the tailgate and configured to generate a torque to reduce a mechanical effort provided by the linear actuator to drive the tailgate to the closed position;

at least one sensor configured to sense an angular position of the tailgate; and a controller configured to control the system;

wherein the controller is configured to receive, from the at least one sensor, a torque value based specifically on the torque generated by the counterweight member for use by the controller to control the system.

2. The system of claim 1, wherein the tailgate comprises an outer panel, an interior panel, and an inner space, the counterweight member being configured to be mounted in the inner space.

3. The system of claim 2, wherein the linear actuator is configured to be disposed outside the inner space.

4. The system of claim 1, wherein the counterweight member is a torsion spring.

5. The system of claim 1, wherein the counterweight member is a torsion rod.

6. The system of claim 1, further comprising at least one latch configured to lock the tailgate in the closed position.

7. The system of claim 6, wherein the at least one latch is configured to cinch the tailgate towards the closed position.

8. The system of claim 1, further comprising a switch configured to trigger the controller.

9. The system of claim 8, wherein the switch is disposed on a wireless key fob.

10. The system of claim 8, wherein the switch is accessed via a graphical user interface on a smart phone.

* * * * *